(12) United States Patent
Farquhar et al.

(10) Patent No.: US 6,686,539 B2
(45) Date of Patent: Feb. 3, 2004

(54) TAMPER-RESPONDING ENCAPSULATED ENCLOSURE HAVING FLEXIBLE PROTECTIVE MESH STRUCTURE

(75) Inventors: Donald S. Farquhar, Endicott, NY (US); Claudius Feger, Poughkeepsie, NY (US); Voya Markovich, Endwell, NY (US); Konstantinos I. Papathomas, Endicott, NY (US); Mark D. Poliks, Vestal, NY (US); Jane M. Shaw, Stony Creek, CT (US); George Szeparowycz, Hopewell Junction, NY (US); Steve H. Weingart, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 09/753,932

(22) Filed: Jan. 3, 2001

(65) Prior Publication Data

US 2002/0084090 A1 Jul. 4, 2002

(51) Int. Cl.⁷ ................................................ H05K 5/06
(52) U.S. Cl. ...................... 174/52.3; 361/752; 713/194; 174/52.2

(58) Field of Search ........................... 174/52.2, 52.3; 713/194; 361/752

(56) References Cited

U.S. PATENT DOCUMENTS

| | | | |
|---|---|---|---|
| 5,027,397 A | | 6/1991 | Double et al. |
| 5,353,350 A | | 10/1994 | Unsworth et al. |
| 5,389,738 A | | 2/1995 | Piosenka et al. |
| 5,406,630 A | | 4/1995 | Piosenka et al. |
| 5,761,054 A | * | 6/1998 | Kuhn .................. 361/818 |
| 5,858,500 A | | 1/1999 | MacPherson |

* cited by examiner

*Primary Examiner*—Hung V. Ngo
(74) *Attorney, Agent, or Firm*—McGinn & Gibb, PLLC; Ronald A. Kaschak

(57) ABSTRACT

A structure and method for forming a tamper respondent electronic circuit enclosure that includes an integrated circuit structure, a mesh structure surrounding the integrated circuit structure, and a sealed enclosure surrounding the mesh structure. The mesh structure includes a layer of flexible dielectric having a first side and a second side, a screen-printed pattern of flexible electrically conductive first circuit lines forming a first resistor network on the first side, and a photo lithographically-formed pattern of flexible electrically conductive second circuit lines forming a second resistor network on the second side.

17 Claims, 5 Drawing Sheets

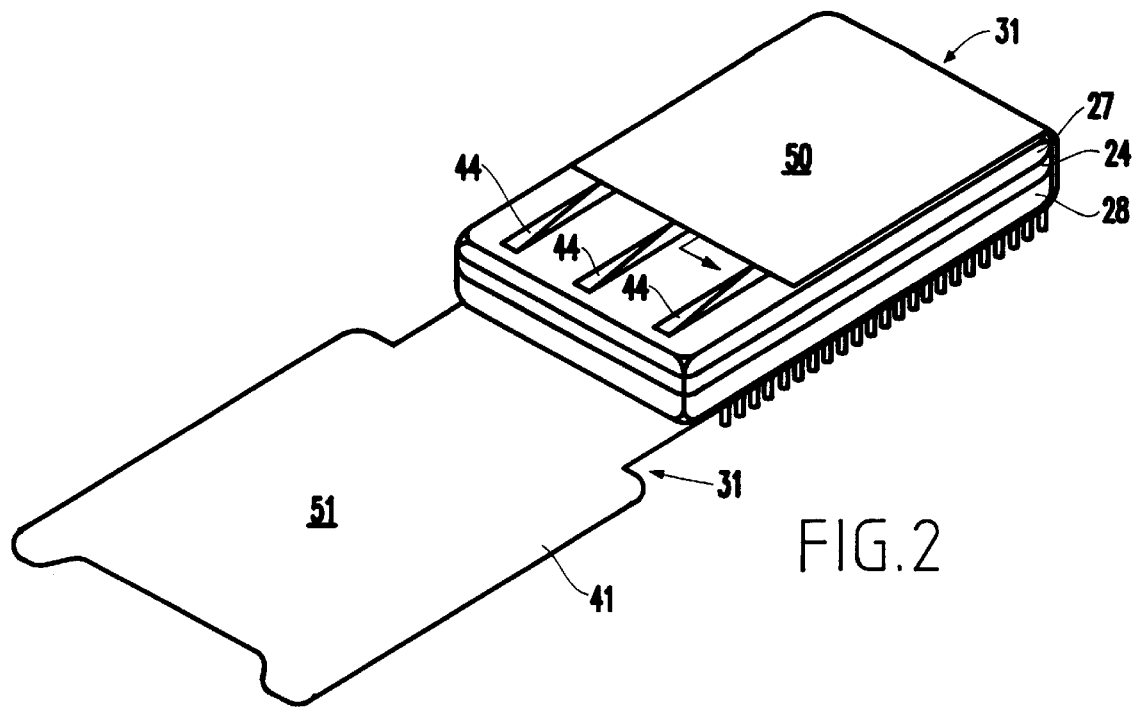
FIG.2
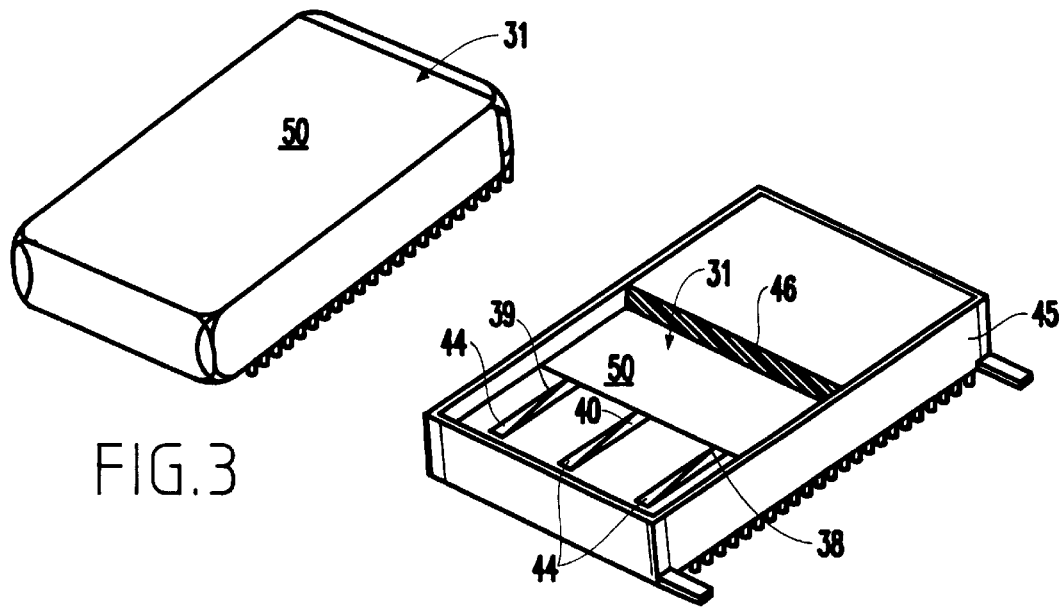
FIG.3
FIG.4

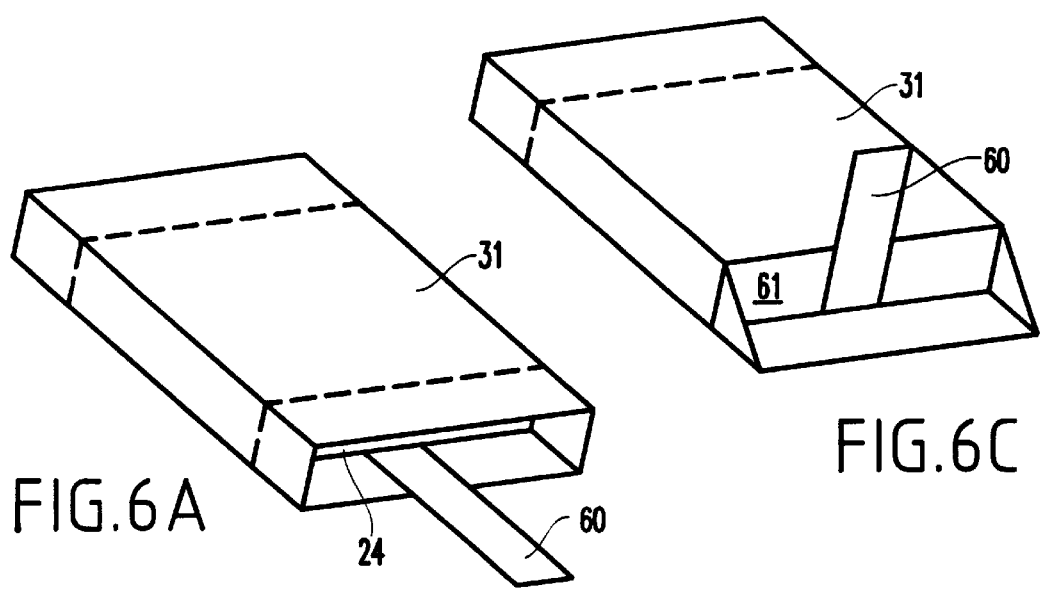
FIG.6A
FIG.6C
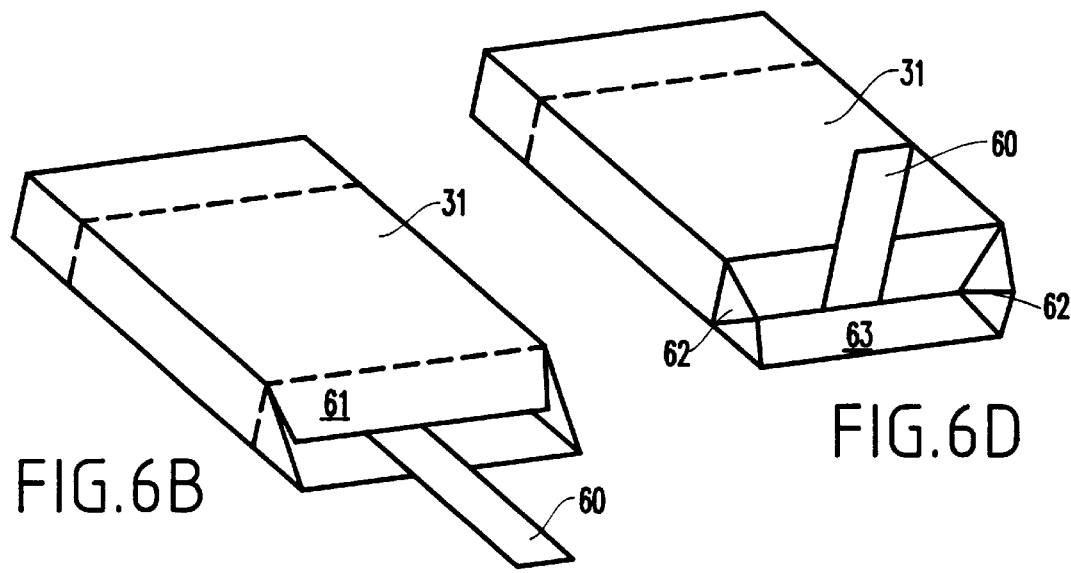
FIG.6B
FIG.6D
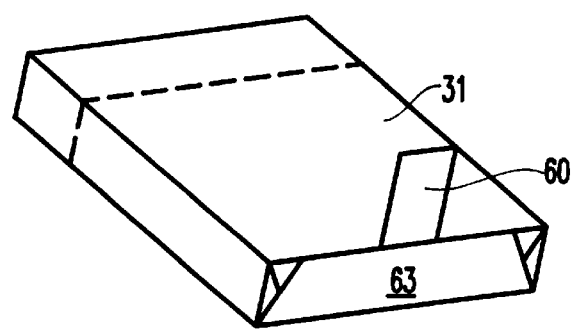
FIG.6E

TAMPER-RESPONDING ENCAPSULATED ENCLOSURE HAVING FLEXIBLE PROTECTIVE MESH STRUCTURE

BACKGROUND OF THE INVENTION

1. Field of the Invention

This invention relates generally to detection of intrusion into electronic assemblies, and more particularly, to the detection of intrusion by mechanical means for the purpose of reading the data stored in a memory.

2. Description of the Related Art

As the value of computing systems increases and operating systems become more secure, physical attacks on computing systems to steal or modify assets become more likely. This invention describes a system and method for building a barrier around a computing system to prevent access to, or modification of the data and processing elements. In the event of an attack being detected, electronic circuitry in the computing system can detect the intrusion, erase all of the secret or critical data, and halt operation.

In many computer applications, it is desirable to protect the contents of the computer system from unlawful or unauthorized access. It is conventional practice to prevent reading of information electronically by providing certain encryption schemes wherein data is transmitted and received in an encrypted form and only authorized people who have the decryption key are able to read the data. A computer system, in this context, can be defined as all of the components being protected by this invention including, but not limited to, a microprocessor or microcomputer, its memory devices, its logic and control devices, input/output processing devices (including cryptographic processors, communication devices and processing elements), and all of the buses and interconnect wiring between the components. The invention prevents any access to the secret information contained or being processed in the protective device, as well as prevents observation or modification of the ongoing computing processes. In the event intrusion is detected, all processing is halted and all secret information is erased.

There are many different types of encryption schemes which are useful in protecting the sensitive data against being read by unauthorized persons. Encryption keys and other sensitive data are often stored in I/C (integrated circuit) memory components within the computer. By use of software, the stored information is generally adequately protected from unauthorized persons using keyboard entries to attempt memory interrogation.

However, an unauthorized person with the necessary skills and knowledge, and sufficient motivation can bypass software controls and attack the computer hardware directly. There are many attacks, some straight forward and well known, others more sophisticated, that allow direct interrogation of memory components and devices.

One scheme of protection against such attacks is to provide some type of detecting means which detect any attempted mechanical intrusion into the sensitive area of the computer. When such intrusion is detected an alarm is given and/or a signal is sent to circuitry, which erases the data, thereby preventing the compromise of the information which was stored in the computer memory components. Various schemes have been proposed which provide for some type of electronic or electrical grid surrounding the computer circuitry and, when this electrical grid is broken or breached, the requisite signal is generated.

These types of systems, however, have several drawbacks. One drawback is that many grids are susceptible to very careful mechanical manipulation that allows the computing system to be accessed without breaking or otherwise compromising the circuit. Still other more sophisticated attacks, through ionizing radiation (e.g. x-rays) affect volatile memory devices such that an erasure command is not effective, thereby allowing the electrical wrapping to be circumvented.

The present invention overcomes these defects by providing a flexible mesh assembly structure that includes uniquely designed resistive structures that detect intrusion and other physical damage. Further, the resistive structures make the flexible mesh assembly optically opaque and may obscure x-ray and other ionizing radiation intrusion.

SUMMARY OF THE INVENTION

It is, therefore, an object of the present invention to provide a structure and method for a tamper respondent electronic circuit enclosure having an integrated circuit structure, a mesh structure surrounding the integrated circuit structure, and a sealed enclosure surrounding the mesh structure. The mesh structure includes a layer of flexible dielectric having a first side and a second side, a screen-printed pattern of flexible electrically conductive first circuit lines forming a first resistor network on the first side, and a photolithographically-formed pattern of flexible electrically conductive second circuit lines forming a second resistor network on the second side. When viewed from the side, the first circuit lines appear interleaved with the second circuit lines. The first circuit lines comprise conductive ink lines and the second lines comprise metal lines. The electronic circuit enclosure can also include an electrical connection between the first circuit lines and the second circuit lines, and a pressure sensitive adhesive adapted to connect the mesh structure to the integrated circuit structure. The first circuit lines may have a different width than the second circuit lines.

The invention can also include a method of manufacturing a tamper respondent electronic circuit article which includes screen printing a pattern of flexible electrically conductive first circuit lines forming a first resistor network on a first side of a flexible dielectric and photolithographically forming a pattern of flexible electrically conductive second circuit lines which form a second resistor network on a second side of the flexible dielectric.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is a schematic perspective diagram of a circuit board partially wrapped with a flexible mesh structure;

FIG. 3 is a schematic perspective diagram of the circuit board completely wrapped with the flexible mesh structure;

FIG. 4 is a schematic perspective diagram of the structure in FIG. 3 placed within an enclosure;

FIGS. 6A–6E are schematic perspective diagrams illustrating an alternative method of wrapping the mesh around the circuit card;

DETAILED DESCRIPTION OF REFERRED EMBODIMENTS OF THE INVENTION

Figure 1:
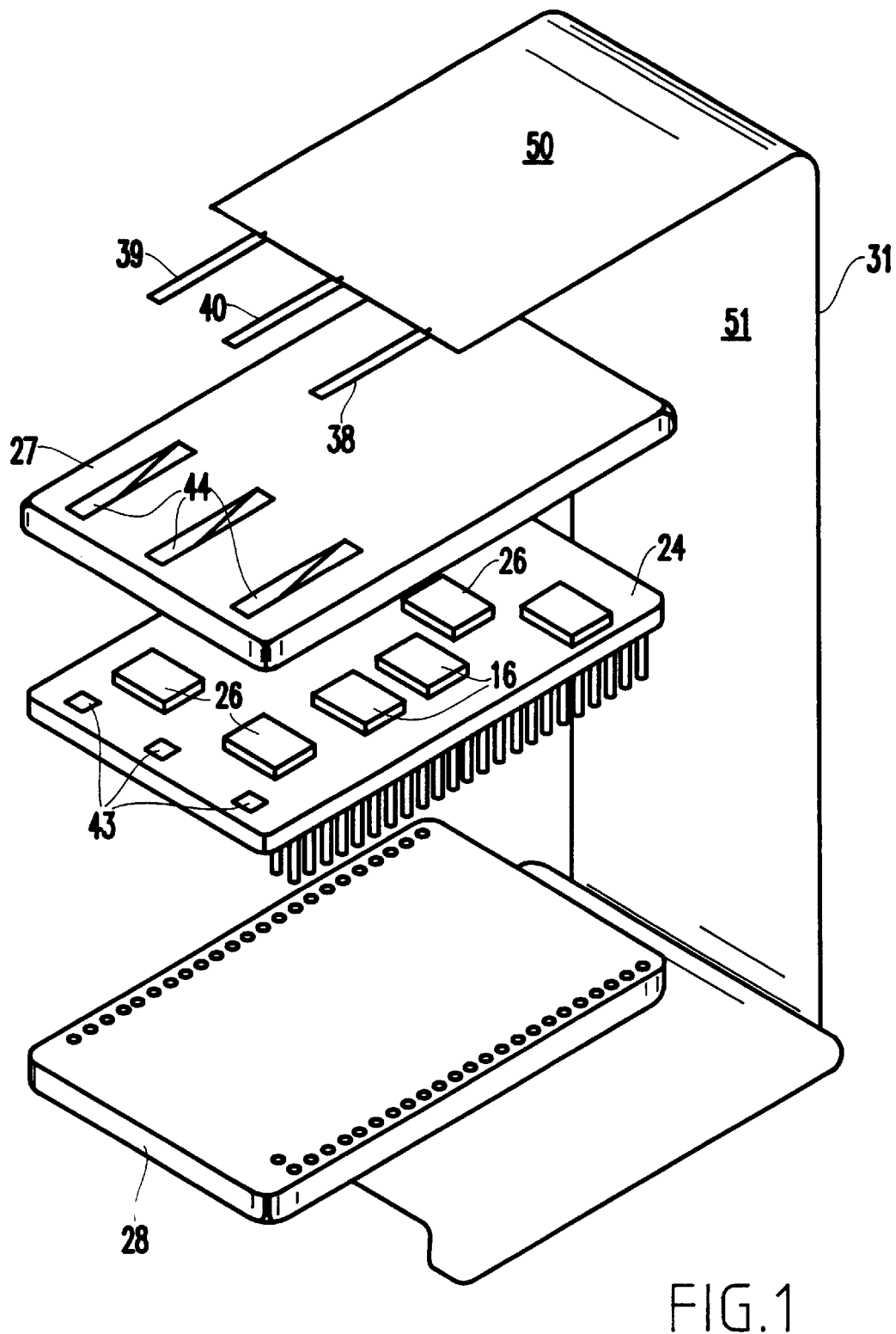
FIG. 1 is a schematic perspective diagram of components that will be included within an enclosure.

Referring now to the drawings, one exemplary enclosure according to the invention is shown in perspective view in FIGS. 1–4. FIGS. 5A–5F illustrate cross-sectional views of the flexible mesh that produces many benefits of the invention. More specifically, referring to FIG. 1, the internal components within the enclosure are shown in an exploded perspective view. In FIG. 1, a circuit card 24 is provided which contains thereon the various components for encryption and key storage in volatile memory 16, and the battery and the protection circuitry for the volatile memory for the encryption/decryption facility. The components other than the volatile memory 16 are designated generally as 26, all being shown conceptually. These components may also include a battery. The specific location, number and function are not critical to this invention.

Disposed over each side of the circuit card 24 are a pair of plastic preforms 27 and 28 which fit over the components and provide the proper control surface or form-factor for the wrapping of the mesh member which will be described presently. If the circuit card 24 employs pins, then holes (unnumbered) or slots to receive such pins are provided in preform 28. The circuit card 24 and the preforms 27 and 28 are stacked in superimposed relationship so as to receive a flexible mesh structure (e.g., mesh member) 31 wrapped therearound which will form the barrier against any unauthorized attempts at mechanical, chemical, or ionizing intrusion to the circuit card 24.

Figure 5A:
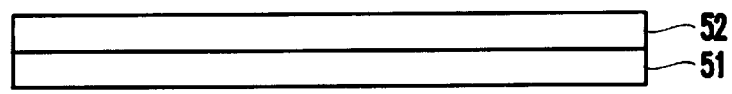
FIGS. 5A–5F are schematic cross-sectional diagrams of the flexible mesh structure.
Figure 5B:
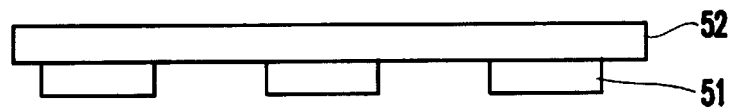
Figure 5C:
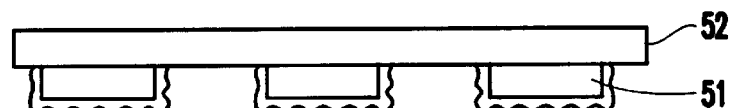
Figure 5D:
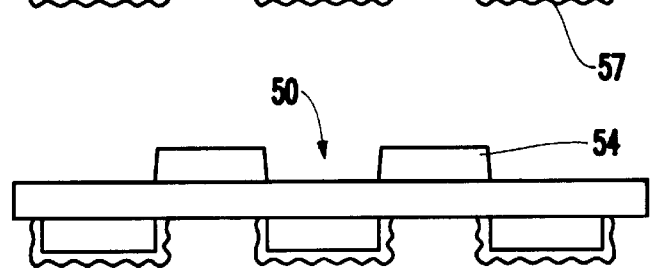
Figure 5E:
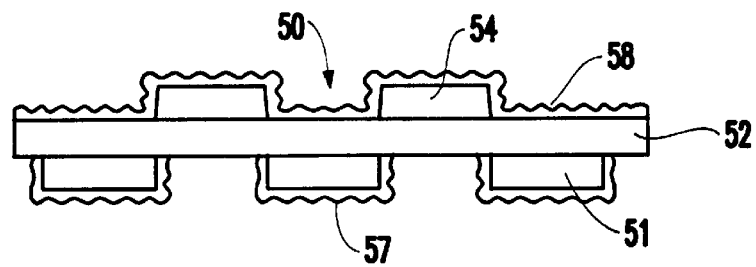
Figure 5F:
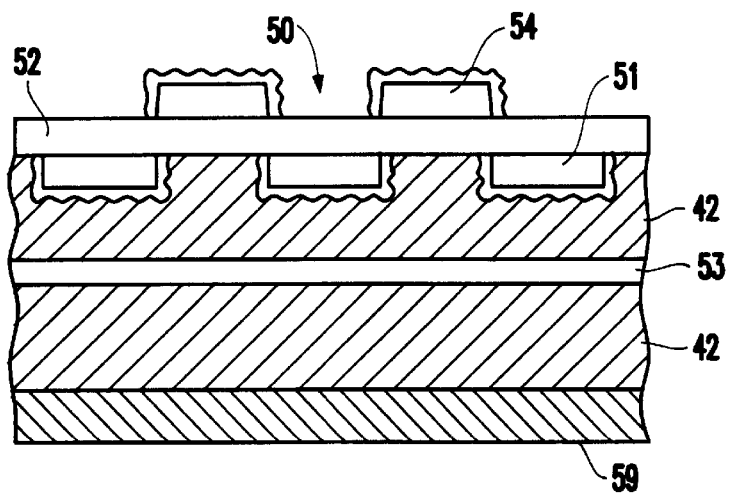

As shown in FIG. 5F, discussed below, the flexible mesh structure 31 includes a screen-printed resistive conductive pattern 50 on one side and a photolithographically formed resistive wiring pattern 51 on the other side. The flexible mesh structure 31 includes electric leads 38–40 that are connected to the resistive patterns 50, 51. For example, the lead 39 could connect to the outer resistive pattern 50 while another lead 38 could connect to the inner resistive wiring pattern 51. Electrical lead 40 could be a common voltage supply for both resistive conductive patterns 50, 51. The foregoing external connections to the flexible mesh structure 31 are merely exemplary and, as would be known by one ordinarily skilled in the art given this disclosure, many other forms of electrical connections can be made with the inventive structure. The mesh will also be formed with a pair of side flaps 41 which serve to protect the edges of the circuit card.

In operation, any form of intrusion or dismantling of the device will result in one or more of the lines within the resistive networks 50, 51 being broken. Such a break will change the resistance values seen at the leads 38, 39. Upon any change in resistance, the underlying circuit will take necessary action, such as erasing all cryptographic information, to protect data.

The mesh 31 is also preferably provided with an adhesive backing 42, and as shown in FIG. 2, the mesh member 31 is partially wrapped around the superimposed circuit card and plastic preforms.

The electrical contacts 38, 39 and 40 are connected to their respective terminals 43 on the circuit card 24 through openings 44 in the preform 27. These terminals 43 are mainly schematic or conceptual representations of the contact points on the card 24. The remaining portion of the mesh membrane is then wrapped around completely to cover the mesh contacts and the side flaps 41 are folded over the preform sides as shown in FIG. 3.

This configuration provides a card with components thereon which is essentially completely enclosed with a mesh 31 that has conductive lines formed thereon with an adhesive 42 providing a bond to the preforms 27 and 28. The assembly shown in FIG. 3 is then placed in an outer steel container 45 and completely encapsulated with a thin layer of epoxy, urethane, silicone or other polymeric coating 46 which becomes very hard and brittle upon curing. The container 45 provides a degree of EMI shielding for the circuit card 24 components. The epoxy 46 is chosen such that it is harder and more brittle, and more rugged and durable than the materials making up the mesh member 31. Alternatively, the coating 46 could comprise a flexible material that is equally or more difficult to remove without damaging the mesh member 31.

Attempts to mechanically remove the coating 46 will result in a variety of fracture modes which will in turn cause lines 50 to break or rupture when the epoxy fractures. The bonding of the epoxy 46 to the mesh is of a type such that it is extremely difficult to separate the epoxy 46 mechanically from the mesh 31 without disrupting the underlying lines 50. Further, the strength of the bond of the epoxy 46 to the lines 50 is stronger than the strength of the bond of the lines 50 to the substrate 52 and thus will thwart any attempted mechanical intrusion through the epoxy 46 and mesh 31 to get to the volatile memory components 25. The epoxy material 46 is chosen such that the epoxy and the materials making up the mesh member 31 are both subject to attack by similar solvents or reagents, and thus attempts to dissolve the epoxy 46 are highly likely to result in chemical attack of the lines 50 by the solvent which will cause changes in resistance (e.g. shorts, or opens) in the lines 50.

FIGS. 5A–5F illustrate a preferred method of manufacturing the inventive mesh 31. As seen in FIG. 5A, the mesh member 31 begins with a tough flexible substrate such as film 52 of Mylar or Kapton (trademarks of E. I. DuPont de Nemours and Company, Wilmington, Del., for polyethylene terepthalate and polyimide, respectively). A conductor, such as a metal 51 is deposited on the substrate 52. The conductive layer 51 is then patterned photolithographically to produce the patterned wiring structure 51 shown in FIG. 5B. A passivating covering 57 (e.g., CrCu) is then deposited to prevent oxidation of the wiring 51, as shown in FIG. 5C.

As shown in FIG. 5D, ink lines 54 are formed of conductive particles, such as particles of silver and carbon which are dispersed in an organic matrix material such as polyvinyl chloride or polyester. These lines 54 are screened onto the Mylar film 52 by conventional screening processes and are sufficiently close together and of a size to provide a deterrent to mechanical probing of the circuit card. In FIG. 5E, a thin organic topcoat film 58 over the lines 54 provides environmental protection to the lines 54, from such things as moisture and atmospheric contaminants. While the invention allows flexibility with respect to the spacing of the conductive regions, in a preferred embodiment the ink lines 54 have a width of 250 microns (or smaller, e.g., 50 microns). The metallic wiring 51 appears interleaved with the ink lines 54, when viewed from the top of the mesh 31, to further restrict access to the structure.

As shown in FIG. 5F, a pressure sensitive adhesive 42 is then applied to the spaces between the wiring 51. A second substrate 53 and additional pressure sensitive adhesive can be bonded to the bottom of the structure to permit bonding to the preforms 27, 28. The layer 53 prevents damage to circuit elements 51 upon folding of the mesh around the preforms 27, 28. Since the adhesive 42 is pressure sensitive, it does not require heat to form a bond. Such pressure sensitive adhesive is typically provided with a release film 59 that is peeled away prior to forming contact with the mating surfaces. It is important that the lines 51, 54 adhere better to the pressure sensitive adhesive 42 then they do to the substrate 52. This causes any attempts to remove the preforms 27, 28 or the pressure sensitive adhesive 42 to break the lines and allow the intrusion to be detected.

FIGS. 6A–6E illustrate an alternative and preferred embodiment of folding the mesh 31 around a structure that does not include pins. More specifically, in this embodiment, the mesh 31 is folded around the circuit card 24 in a process that is similar to a process of wrapping a box with a covering. More specifically, a first lap 61 is folded downward over the circuit card 24, as shown in FIGS. 6B and 6C. Then, as shown in FIG. 6D, corners 62 are folded and a lower flap 63 is formed and folded up, as shown in FIG. 6E. Item 60 represents the protruding power supply and signal ribbon cable.

Figure 7:
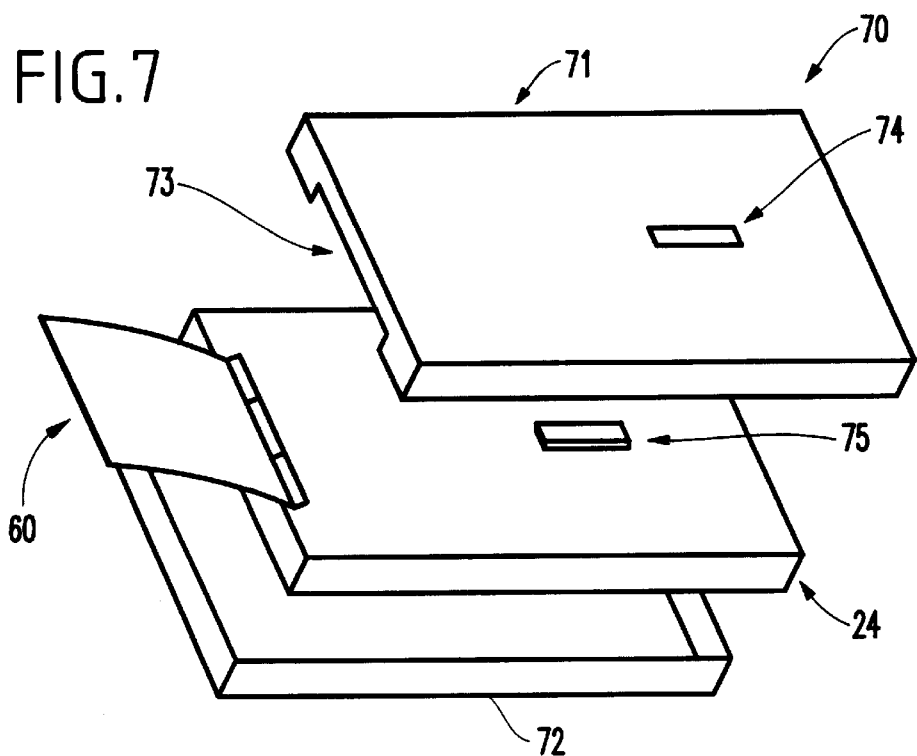
FIG. 7 is a schematic diagram illustrating an alternative box structure to surround the card.

In addition, FIG. 7 illustrates a different and preferred embodiment of the cryptographic card 24 covering. In this embodiment, rather than using plastic preforms 27, 28, as discussed above, a metal box 70 with a top 71 and a bottom 72 are utilized. Both halves, 71, 72 are formed of metal, preferably a conductive metal such as copper. The top 71 and bottom 72 have smooth and rounded edges to prevent damage to the mesh 31. The box also includes opening 73 to allow for the power supply ribbon cable 60 (note, there are no pins on the card) to pass through. Further, the box includes an opening 74 for the mesh cable end and a connector 75 for the mesh cable end.

After the circuit card 24 is placed in the enclosure 70, the mesh cable ends 80 (see FIGS. 8A–8B, discussed below) are inserted through the opening 74 and into the connector 75 on the card 24. In addition, the communication and power supply ribbon cables 60 are attached to the card 24 and fed through the opening 73 in the enclosure 70. The communication and power supply ribbon cable 60 is positioned in such a way during the subsequent folding operation (e.g., see FIGS. 6A–6E, discussed above) to provide a serpentine escape path through the folded mesh 31.

Figure 8A:
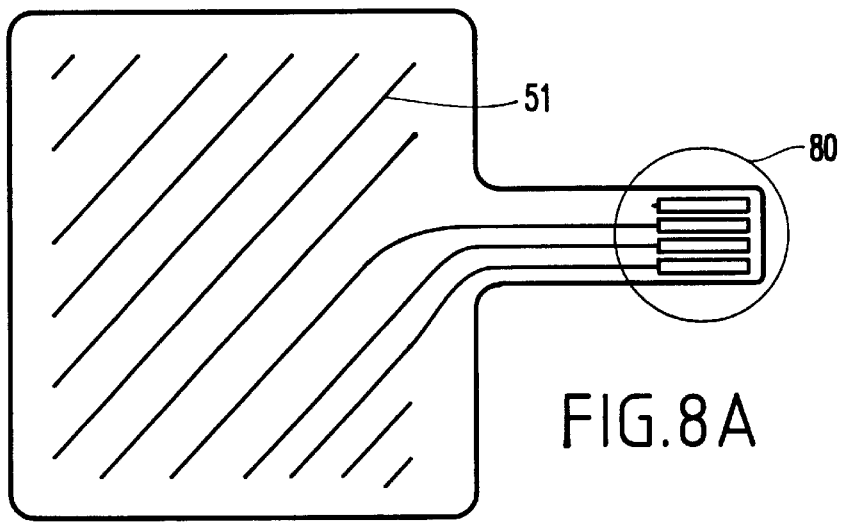
FIGS. 8A–8B are top and cross-sectional schematic diagrams, respectively, illustrating the cable ends that are integrated into the inventive structure.
Figure 8B:
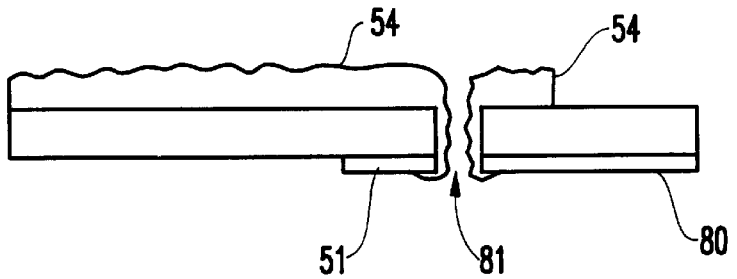

FIGS. 8A–8B illustrate the cable ends 80 that are integrated into the inventive mesh structure 31. Each cable end 80 may consist of multiple conductive traces that connect to the circuit patterns that are on the opposing faces 50, 51 of the mesh. Each of these faces 50, 51, comprises circuit lines that are formed in a network preferably forming a bridge or divider circuit. Such a circuit could comprise a high voltage supply node, a low voltage supply node, a network of series and parallel conductive traces connecting these two nodes, and/or one or more sensing nodes, where the voltage within the network is monitored by the tamper detection circuitry. The network is designed in such a way that monitoring the voltage at the sensing nodes will allow detection of an open or short circuit anywhere in the network.

During the formation of the metal lines 51, metal layers can be extended to form the integrated circuit cable end 80. For long-term reliability, it may be desirable to overplate the integrated cable end 80 with nickel and gold on the contact surfaces. The screened ink lines 54 could be terminated in a similar fashion, where the ink is extended from the network circuit to the cable ends.

In an alternative embodiment shown in FIG. 8B, the invention makes connections from the screen ink lines 54 to the metal lines 51 by forming a hole 81 in the substrate 52 after forming the lines 51 but before screen printing the ink lines 54. The screening process which forms the ink lines 54 will at least partially fill the hole 81 and form a connection between the ink lines 54 and the wires 51. This permits all the conductors 51, 54 to terminate in a single end connection 80. It is more desirable to have the metal lines 51 form a terminal connection 80 because a metal connector is more stable and reliable in general than a screen printed ink connector.

The invention utilizes several wiring pattern features to make the mesh 31 more sensitive to intrusion. More specifically, the invention patterns the wiring to meet the following criteria. The lines are patterned such that adjacent lines in the patterns are far apart on the distributed resistance of the line and are asymmetrically distant from a single point. Thus, when the adjacent lines short circuit, a large signal will be produced that will be easily detected by the tamper sensing electronics. In addition, the pattern is designed such that the current flow in each segment is balanced by a segment that is close by, and carries current in the opposite direction. This minimizes the sensitivity to elector-magnetic interference. The proximity of the opposing segments also minimizes thermal differential affects that can cause false output signal changes.

The invention produces a number of advantages when compared to conventional enclosures. One advantage is cost-reduction. The cryptographic physical protection standard as defined by FIPS level 4 standard can be achieved in a single layer mesh with the invention if finer width and pitch circuit lines are used. Compared to conventional structures which utilized two layers, the invention produces an obvious cost benefit by reducing the number of processing steps and the amount of material that is required.

In addition, the invention uses a higher yielding manufacturing process. By first forming the metal circuit lines photolithographically (e.g. in a roll format), and then screening the ink traces on only one side, the invention reduces the number of ink screening steps from 4 to 1. Since the ink screening processes are lower yielding than the photolithographic processes used to form metal lines, the invention has a higher yield when compared to conventional systems. The yield comparison is especially important when fine lines are required, for example when lines and spaces on the order of 250 um are required.

Also, by forming the ink lines 54 using a printing process and forming the wiring 51 using a photolithographic process, the ink lines 54 can have a different width than the wiring lines 51. While the ink lines 54 and the wiring 51 can have different widths, the pitch is preferably the same, such that the lines 54 and wires 51 appear interleaved when the mesh 31 is viewed from the top or bottom. This feature makes it more difficult for a potential intruder to predict the overlapping patterns of the different resistive networks.

Further, by forming the wires 51 lithographically, a much smaller spacing between the conductive elements can be produced than with ink printing. Preferably, the ink lines 54 are positioned so as to appear to "fill" the spaces between the wires 51 when the mesh is viewed from the top or bottom. This allows the mesh structure 31 to be optically opaque to radiation sources. Further, the wiring pattern 51 can be formed in a roll process, which substantially increases processing efficiency. One exemplary roll process begins with a roll of the two-layer structure illustrated in FIG. 5A.

The roll would be fed through a standard photographic development process to form the photolithographic lines 51. Steps in the photographic development process would include precleaning, application of a photoresist, exposure of the photoresist to actinic radiation (UV light) to define regions of material that will become cross-linked to protect the underlying conductor 51 (e.g., copper) from subsequent etching. Then a standard sequence of immersion in a developing solution (to remove the un-cross linked resist), exposure to an etchant to remove the conductor 51, and exposure to a stripping solution to remove the photoresist. If required, protective coatings could be applied to protect the conductor 51.

In addition, in a preferred embodiment, the invention only includes two resistive networks. This increases manufacturing efficiency by simply allowing each of the resistive networks 50, 51 to be formed on alternate sides of a flexible substrate 52 and does not require complicated wiring connections between different layers of a laminated structure. More specifically, the invention does not require alignment of multiple circuitized substrates because the active circuits are on opposite sides of a single substrate 52, which produces substantial cost savings. Further, by utilizing a pressure sensitive adhesive, the sandwich of layers 42, 53, 42 can be manufactured separately as an assembly and roll laminated against the structure 51, 52, 54. Optionally, a heat activated adhesive can be used in place of the pressure sensitive adhesive. Not only is this process simplified and very cost-effective, the roll process also avoids entrapment of air.

Further, the top coat 58 is preferably the same color as the ink lines 54 to deter observation of the lines 54. The top coat 58 also adheres very strongly to the lines 54 so that if the lines are separated from the top coat 58 they will be damaged.

From a security standpoint, by making the top layer of conductive ink, security is increased due to the physical properties of the ink. The ink is difficult to attach electronic leads to and therefore thwarts probe attacks or attempts to add wires to bypass sections of the mesh. Further, as discussed above, the conductors 51, 54 adhere to the pressure sensitive adhesive 42 more firmly than they adhere to the substrate 52 which makes any attempts to remove the potting material 46 difficult and causes the lines to break resulting in a tamper indication. To make manipulation of the ink lines even more difficult, the invention forms the ink lines of chemicals which are similar to the potting material 46 so that solvents that will affect the potting material 46 also affect the ink lines in a similar way. Further, the appearance of the ink, by visual or other imaging technologies, is similar to the appearance of the potting material 46 which renders detection of the lines more difficult during machining attacks and makes it more likely that the lines will be damaged.

While the invention has been described in terms of preferred embodiments, those skilled in the art will recognize that the invention can be practiced with modification within the spirit and scope of the appended claims.

What is claimed is:

1. A tamper respondent electronic circuit article comprising:
   a layer of flexible dielectric having a first side and a second side;
   first circuit lines comprising conductive ink forming a first resistor network on said first side; and
   second circuit lines consisting of metal forming a second resistor network on said second side.

2. The article in claim 1, wherein said first circuit lines appear interleaved with said second circuit lines when viewed from said first side or said second side.

3. The article in claim 1, further comprising an electrical connection between said first circuit lines and said second circuit lines.

4. The article in claim 1, further comprising an adhesive adapted to connect said flexible dielectric to said electronic circuit article.

5. The article in claim 1, wherein said first circuit lines have a different width than said second circuit lines.

6. A tamper respondent electronic circuit enclosure comprising:
   an integrated circuit structure;
   a mesh structure surrounding said integrated circuit structure; and
   a sealed enclosure surrounding said mesh structure, wherein said mesh structure comprises:
   a layer of flexible dielectric having a first side and a second side;
   a screen-printed pattern of flexible electrically conductive first circuit lines forming a first resistor network on said first side; and
   a photolithographically-formed pattern of flexible electrically conductive second circuit lines consisting of metal forming a second resistor network on said second side.

7. The enclosure in claim 6, wherein said first circuit lines are interleaved with said second circuit lines when viewed from said first side or said second side.

8. The enclosure in claim 6, wherein said first circuit lines comprises conductive ink lines.

9. The enclosure in claim 6, wherein said second lines comprises metal lines.

10. The enclosure in claim 6, further comprising an electrical connection between said first circuit lines and said second circuit lines.

11. The enclosure in claim 6, further comprising an adhesive adapted to connect said mesh structure to said integrated circuit structure.

12. The enclosure in claim 6, wherein said first circuit lines have a different width than said second circuit lines.

13. A tamper respondent electronic circuit article comprising:
   a layer of flexible dielectric having a first side and a second side;
   first circuit lines comprising a screen-printed conductive ink and forming a first resistor network on said first side; and
   second circuit lines consisting of a photolithographically-formed conductive metal and forming a second resistor network on said second side.

14. The article in claim 13, said first circuit lines are interleaved with said second circuit lines.

15. The article in claim 13, further comprising an electrical connection between said first circuit lines and said second circuit lines.

16. The article in claim 13, further comprising a pressure sensitive adhesive adapted to connect said article to an integrated circuit structure.

17. The article in claim 13, wherein said first circuit lines have a different density than said second circuit lines.

* * * * *